United States Patent [19]
Rosen et al.

[11] Patent Number: 5,170,435
[45] Date of Patent: Dec. 8, 1992

[54] WAVEGUIDE ELECTROACOUSTICAL TRANSDUCING

[75] Inventors: Michael D. Rosen, Auburndale; Hal Greenberger, Framingham, both of Mass.

[73] Assignee: Bose Corporation, Framingham, Mass.

[21] Appl. No.: 844,893

[22] Filed: Mar. 2, 1992

Related U.S. Application Data

[63] Continuation of Ser. No. 545,851, Jun. 28, 1990, abandoned.

[51] Int. Cl.$^5$ .................... H04B 1/00; H04R 5/00; H04R 1/02; H04R 25/00; H05K 5/00; A47B 81/06
[52] U.S. Cl. ............................. 381/86; 381/24; 381/90; 381/205; 181/144; 181/199
[58] Field of Search ............: 381/86, 87, 88, 89, 381/186, 188, 205, 24, 90; 181/199, 198, 144

[56] References Cited

U.S. PATENT DOCUMENTS

| | | | |
|---|---|---|---|
| 2,301,744 | 11/1942 | Olsen | 381/87 |
| 4,628,528 | 12/1986 | Bose | 381/90 |
| 4,924,962 | 5/1990 | Terai | 381/86 |

FOREIGN PATENT DOCUMENTS

| | | | |
|---|---|---|---|
| 0101031 | 5/1982 | European Pat. Off. | 381/87 |
| 52-2721 | 1/1977 | Japan | 381/88 |

Primary Examiner—James L. Dwyer
Assistant Examiner—Jack Chiang
Attorney, Agent, or Firm—Fish & Richardson

[57] ABSTRACT

A loudspeaker system for radiation into the passenger compartment of a vehicle has one or more elongated acoustic waveguides to efficiently transfer sound pressure energy from a loudspeaker driver outside the compartment into the compartment. Preferred embodiments feature two elongated acoustic waveguides separated by the loudspeaker driver mounted on a hard baffle panel. One waveguide has an effective length of one quarter wavelength at the lowest frequency desired to be reproduced by the loudspeaker driver, and the other waveguide has an effective length three times that of the first waveguide. One or both waveguides may be folded upon itself. The loudspeaker system is driven through circuitry providing reduced system response at frequencies that may cause the deflection of the loudspeaker to exceed its maximum limits. This circuitry includes a high pass filter for transmitting spectral components above the lowest frequency to be reproduced, and a notch filter centered at a frequency where the loudspeaker cone excursion characteristic is a maximum. Another circuit includes boosts the audio spectral components, reduced by the notch filter, into the passenger compartment through another loudspeaker system, comprising a ported enclosure having a port resonance at the notch frequency.

8 Claims, 8 Drawing Sheets

WAVEGUIDE ELECTROACOUSTICAL TRANSDUCING

This is a continuation of application Ser. No. 07/545,851, filed Jun. 28, 1990, now abandoned.

The present invention relates in general to vehicle electroacoustical transducing and more particularly to such transducing comprising acoustic waveguides.

Bose et al., U.S. Pat. No. 4,628,528, incorporated herein by reference, discloses a loudspeaker system comprising an acoustic waveguide. In one embodiment a loudspeaker driver is positioned between two tubes, acting as acoustic waveguides, of differing lengths in the same enclosure to provide efficient coupling of the loudspeaker driver to the medium surrounding the enclosure. The length of the longer tube is typically substantially three times that of the smaller tube.

In general, in one aspect, the invention features a loudspeaker system for radiation into the passenger compartment of a vehicle. One or more elongated acoustic waveguides efficiently transfer sound pressure energy from a loudspeaker driver outside the compartment into the compartment.

Preferably there are two elongated acoustic waveguides separated by the loudspeaker driver, typically mounted on a hard baffle panel.

One waveguide typically has an effective length of one quarter wavelength at the lowest frequency desired to be reproduced by the loudspeaker driver, and the other waveguide has an effective length three times that of the first mentioned waveguide. One or both waveguides may be folded upon itself.

Yet another preferred embodiment of the invention includes driving the loudspeaker system through circuitry providing reduced system response at frequencies that may cause the deflection of the loudspeaker to exceed its maximum limits. This circuitry includes a high pass filter for transmitting spectral components above the lowest frequency to be reproduced, and a notch filter centered at a frequency where the loudspeaker cone excursion characteristic is a maximum. Another preferred embodiment includes structure boosting the audio spectral components, reduced by the notch filter, into the passenger compartment through another loudspeaker system, typically comprising a ported enclosure having a port resonance at the notch frequency.

Numerous other features and advantages will become apparent from the following detailed description when read in connection with the accompanying drawings in which.

Figure 1:
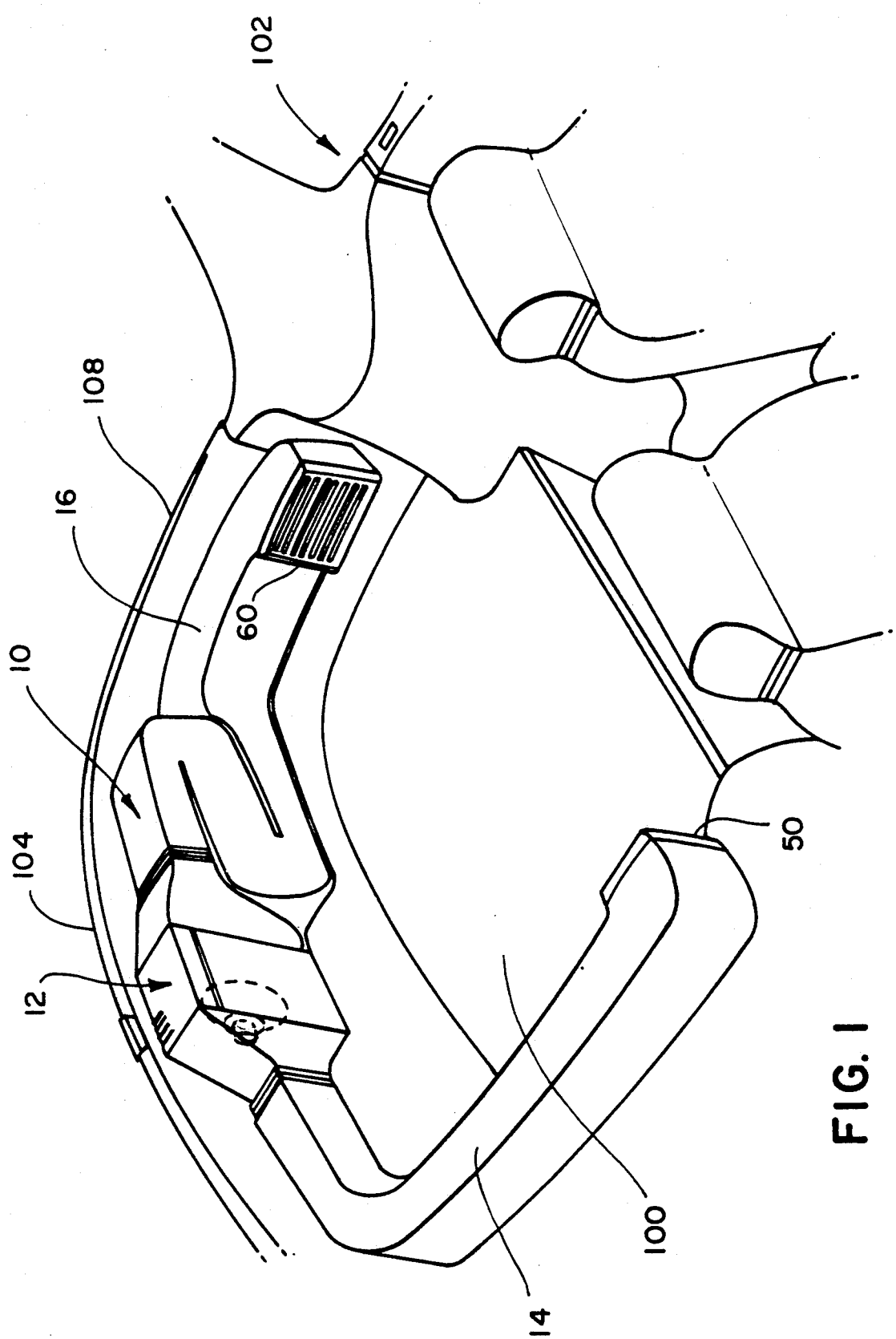
FIG. 1 is a perspective view of an embodiment of the waveguide portion of a loudspeaker system of this invention, installed in an automobile.
Figure 2:
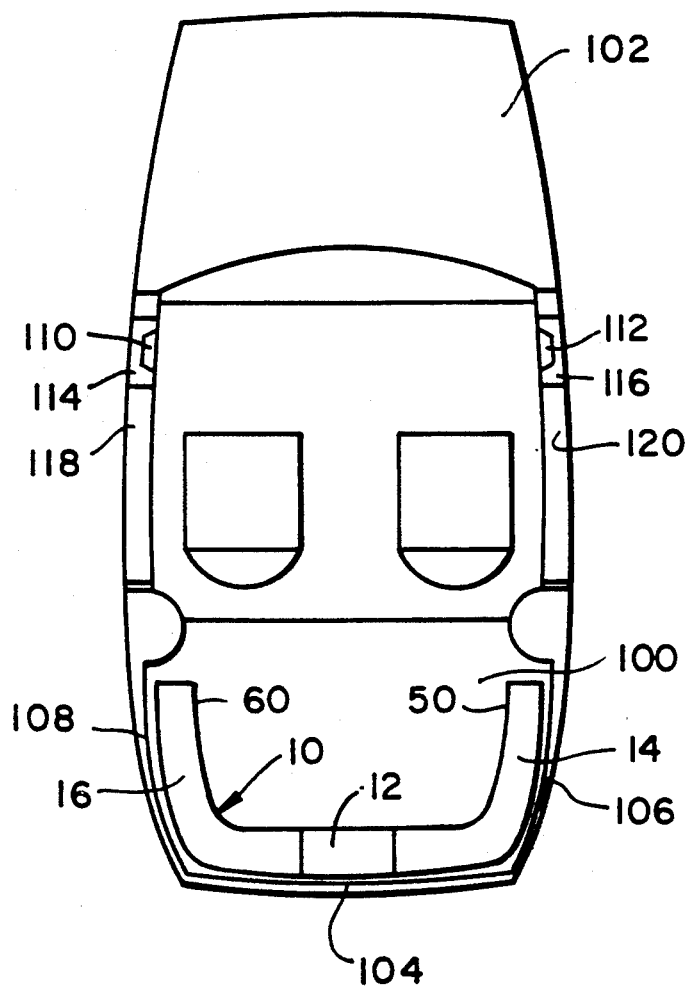
FIG. 2 is a plan view of the loudspeaker system of this invention in an automobile with left and right door-mounted front speakers.

Referring to FIGS. 1 and 2, there is shown an embodiment of a loudspeaker system 10 providing a deep bass response installed in the rear compartment 100 of a hatch-back type automobile 102. The loudspeaker system 10 comprises a loudspeaker driver chamber 12 communicating with two elongated tubular open-ended conduits, or tubular acoustic waveguides, 14 and 16, each disposed on an opposite side of speaker chamber 12. Speaker chamber 12 is located adjacent to the rear interior wall 104 of hatch-back compartment 100 (FIG. 2). Similarly tubular waveguides 14 and 16 are located adjacent to the side interior hatch-back compartment walls 106 and 108, respectively. Speaker output ports 50 and 60 are positioned opposite each other, both facing into compartment 100. Tubular acoustic waveguide 16 is partially folded and of length greater than tubular acoustic waveguide 14.

Referring to FIG. 2, left and right door mounted speaker driver 110 and 112 are each mounted in respective ported enclosures 114 and 116, respectively, inside automobile doors 118 and 120, respectively.

Figure 3:
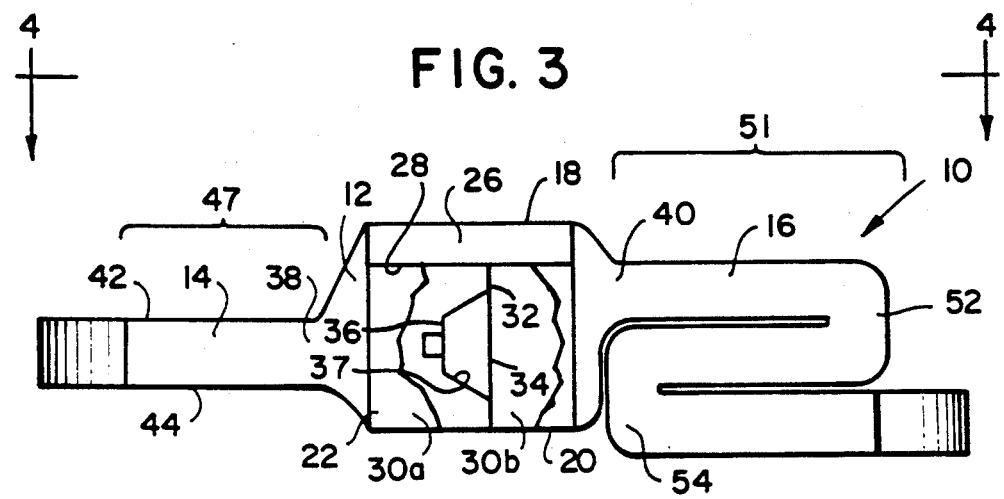
FIG. 3 is a front view of a portion of the embodiment of FIG. 1 showing the relationship of the tubular waveguides to the loudspeaker driver.

Referring to FIG. 3, there is shown a front view of loudspeaker system portion 10 of FIG. 1. Speaker chamber 12 is typically rectangular and includes top, bottom, front and back panels 18, 20, 22 and 24 (FIG. 4) respectively. The panels 18, 20, 22 and 24 are preferably made from materials of sufficient stiffness to present a low compliance to acoustic pressure waves developed within speaker chamber 12, such as hard plastic. A rectangular electronics module enclosure 26 is situated in the upper portion of speaker chamber 12 adjacent to top panel 18. An internal baffle panel 32 extends vertically from the bottom 28 of electronics module enclosure 26 to bottom panel 20, and horizontally from front panel 22 to back panel 24. Baffle panel 32, also made from material with low acoustic compliance, effectively divides speaker chamber 12 into two acoustically isolated portions, 30a and 30b. Loudspeaker driver 36 is mounted on baffle panel 32 coaxial with a central aperture 34 in baffle 32, acoustically isolating the pressure waves generated by forward and reverse deflections of loudspeaker driver cone 37. Aperture 34 is approximately the same diameter as that of cone 37 of loudspeaker driver 36. In one exemplary preferred embodiment the loudspeaker driver 36 is a dual-coil 6-inch diameter Bose 137559 driver, commercially available from Bose Corporation, Framingham, Mass., incorporated herein by reference.

Figure 4:
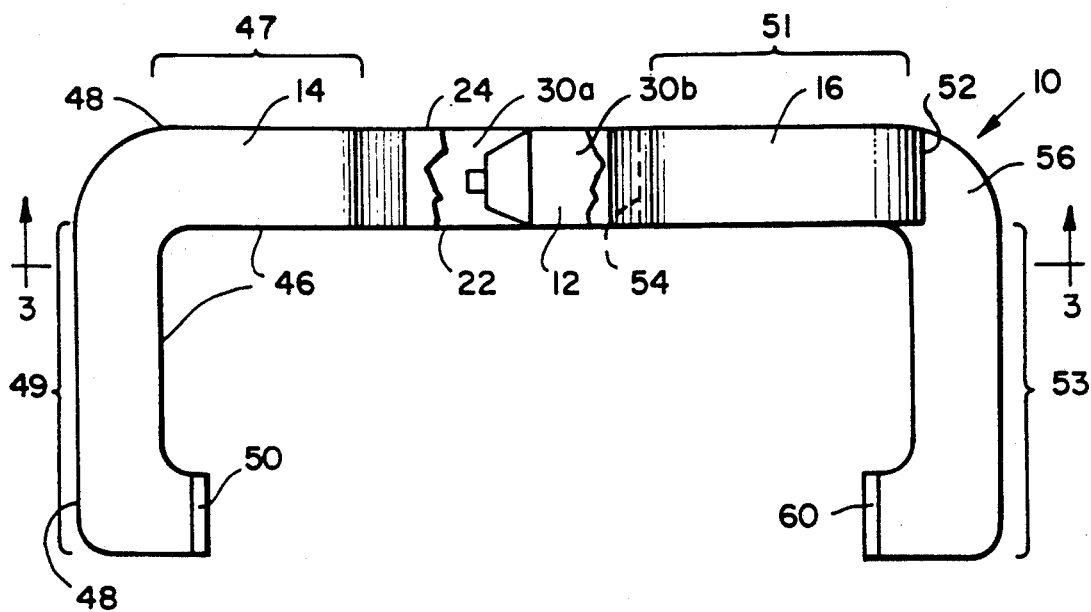
FIG. 4 is a plan view of the loudspeaker system of FIG. 3 showing the relationship of the tubular waveguides to each other.

Referring to FIG. 4 short tubular waveguide 14 comprises a right-angled elongated conduit of uniform rectangular cross section, having a proximal portion 47 extending laterally from speaker chamber 12, and a distal portion 49 extending substantially perpendicular to proximal portion 47. Short tubular waveguide 14 includes top and bottom surfaces 42 and 44, respectively, and side surfaces 46 and 48. Surfaces 42, 44, 46 and 48 are made from materials of sufficient stiffness to present low acoustic compliance over the operational frequency range of the loudspeaker 10. Short tubular waveguide 14 terminates at its distal end in output port 50, which is an aperture, in surface 46, of area substantially equivalent to the cross-sectional area of the rectangular tube defined by tubular waveguide 14.

Long tubular waveguide 16 is similar to, but longer than, short tubular waveguide 14, with its proximal portion 51 (FIG. 3) folded. Proximal portion 51 extends laterally away from speaker chamber 12, folds back on itself at fold 52 and extends laterally toward speaker chamber 12, folds back on itself again at fold 54 and re-extends laterally away from speaker chamber 12. Proximal portion 51 then connects to distal portion 53 (FIG. 4) disposed substantially perpendicular to proximal portion 51. Long tubular waveguide 16 terminates at its distal end in output port 60 which, like output port 50, is an aperture of area substantially equivalent to the cross-sectional area of the rectangular tube defined by tubular waveguide 16. As shown in FIG. 4, output ports 50 and 60 are opposite and facing each other.

The effective length (i.e., taking into account transmission line type end effects) of the long tubular waveguide 16, between the front of driver 36 and output port 60, is substantially three times the effective length of short tubular waveguide 14, between the rear of driver 36 and output port 50. All the surfaces of tubular waveguides 14 and 16 are hard (i.e., low acoustic compliance at the operational frequencies of the loudspeaker) so as to form high Q pressure wave or low loss acoustic transmission lines between driver 36 and each of the output ports 50 and 60 so that large standing wave ratios may be established in these tubular waveguides. The invention effectively uses the tubular waveguides 14 and 16 to couple the pressure wave generated by loudspeaker driver 36 to the air (i.e., surrounding medium) inside the passenger compartment at the output ports 50 and 60 over a relatively broad frequency range extending into the deep bass. These tubular waveguides efficiently couple low frequency energy to the listening area by transforming relatively small excursions of cone 37 of loudspeaker driver 36 to relatively high sound pressure levels at output ports 50 and 60. The tubular waveguides may be regarded as transmission line transformers having a transmission line medium and characterized by an impedance and length for reducing the mismatch between the vibratile diaphragm at one end and the impedance presented by the medium at the other end of the tubular waveguide.

Speaker chamber 30a port 38 (FIG. 1) communicates with the tube defined by short tubular waveguide 14 to acoustically couple pressure waves developed within chamber portion 30a, by the rear of speaker driver 36, into tubular waveguide 14. Port 38 has an area substantially equivalent to the rectangular cross-sectional area of tubular waveguide 14. Tubular waveguide 14 acts as an acoustic transmission line coupling the pressure wave at port 38, at its proximal end, to its distal end output port 50.

Similarly, speaker chamber 30b port 40 communicates with the folded tube defined by long acoustic waveguide 16 to acoustically couple pressure waves developed within chamber portion 30b, by the front of speaker driver 36 into tubular waveguide 16. Port 40 has an area substantially equivalent to the rectangular cross-sectional area of tubular waveguide 16. Tubular waveguide 16 also acts as a transmission line transformer with effective length substantially three times that of tubular waveguide 14.

Figure 5:
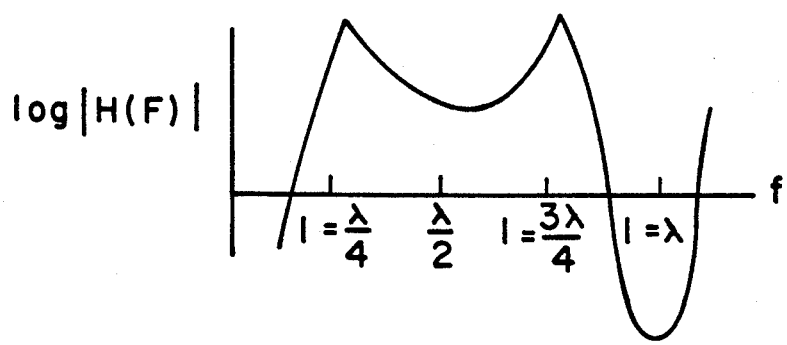
FIG. 5 is a graphic illustration of the frequency response of a loudspeaker system utilizing a single elongated tubular, waveguide.

Referring to FIG. 5, there is shown the frequency response for a system with a speaker driver at the inner end of long tubular waveguide 16. Because the acoustic impedance presented at output port 60 does not terminate the acoustic transmission line formed by long tubular waveguide 6 in its characteristic acoustic impedance, the pressure waves launched by the front of loudspeaker driver 36 are reflected at the open output port 50 to create standing waves inside tubular waveguide 16. As described in Bose, U.S. Pat. No. 4,628,528, for a given driving frequency, the envelope of the resulting standing wave in the tubular waveguide is sinusoidal with minima, maxima and relative phase dependent upon the length of the tubular waveguide and the driving frequency. The waveguide transforms a pressure source comprising loudspeaker driver 36 into a velocity source at output port 60.

As shown in FIG. 5, the frequency at which the length of a tubular waveguide is an odd multiple of one-quarter of the wavelength ($1 = \lambda/4$) results in a peak in the output. At frequencies in between there is reduced output. A phase reversal occurs in the region embracing the frequency corresponding to the guide wavelength.

Figure 6:
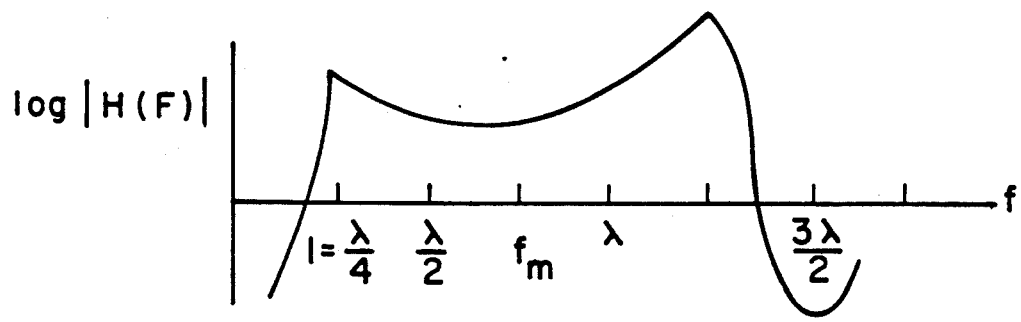
FIG. 6 shows the frequency response of a loudspeaker system of the embodiment of FIG. 1.

Referring to FIG. 6, there is shown the frequency response of acoustical power output for the dual tubular waveguide embodiment of FIG. 1, with tubular waveguide 14 having one-third the effective length of tubular waveguide 16. The frequency axis carries labels expressed as fractions of the wavelength of long tubular waveguide 16. By making tubular waveguide 14 one-third the length of tubular waveguide 16, tubular waveguide 14 coacts with waveguide 16 to provide a practically equalizable response. This arrangement provides a practically usable bandwidth significantly greater than that of a single tubular waveguide system with the phase reversal occurring at a frequency where the length of longer tubular waveguide 16 is three-halves the wavelength ($1 = 3\lambda/2$).

Figure 7:
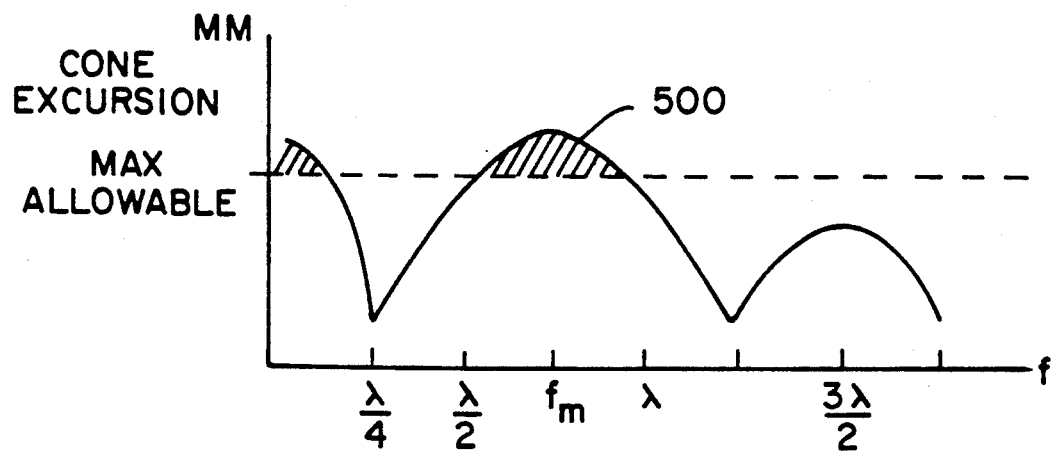
FIG. 7 shows the loudspeaker driver cone excursion as a function of frequency for the embodiment of FIG. 1.

Referring to FIG. 7 there is shown a graph of the loudspeaker cone 37 excursion versus frequency for the dual tubular waveguide embodiment of FIG. 1. Cone excursion is a minimum at the two frequency response peaks of FIG. 6 ($1 = \lambda/4$ and $1 = 5\lambda/4$). Maximum cone excursion occurs at the frequency $f_m$ of the response minimum where the length of long tubular waveguide 16 is three-quarters the wavelength ($1 = 3\lambda/4$). It has been discovered that increasing the cross-sectional area of the waveguides as compared with that used in the Acoustic Wave ® music system improves performance in a vehicle. This larger cross section results in reduced acoustic impedance presented to loudspeaker cone 37 and larger cone excursions to provide the volume levels desired in a relatively noisy vehicle environment. The maximum cone excursions at the frequency $f_m$ may exceed the maximum allowable cone excursion for speaker driver 36 and enter the shaded area 500 in FIG. 7. Cone excursions above the maximum allowable cone excursion limit may cause audible distortion and physical damage to speaker 36.

Figure 8:
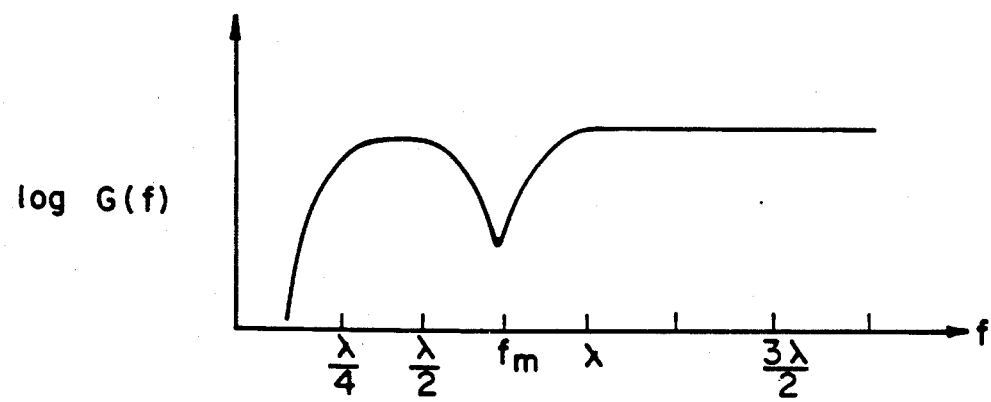
FIG. 8 shows the frequency response of an equalization circuit having a notch at the frequency of maximum cone excursion for the embodiment of FIG. 1.

Referring to FIG. 8 there is shown the frequency response for an electronic circuit for coupling energy to speaker 36 that helps prevent driving cone 37 beyond its maximum allowable cone excursion as shown in FIG. 7. This response has a notch about the frequency $f_m$, and preferably rolls off sharply above $3\lambda/4$ and includes equalization circuitry that produces a substantially uniform response for the loudspeaker system between just below $\lambda/4$ and just above $3\lambda/4$. This notch creates an audible output null in the waveguide portion of loudspeaker system. However, by establishing a corresponding peak in the response of front speaker systems 114 and 116 (FIG. 2), there is no audible system null in the acoustic output at the frequency null $f_m$ of FIG. 8.

Figure 9:
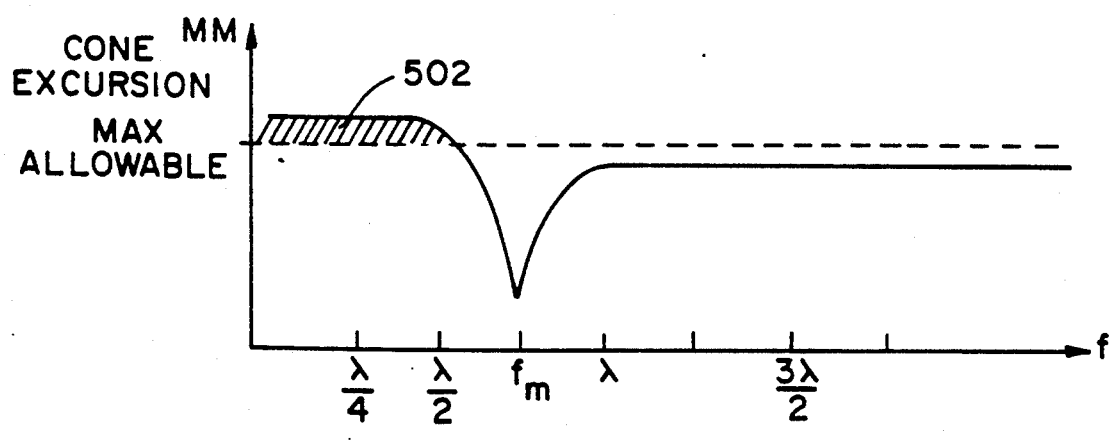
FIG. 9 shows the loudspeaker driver cone excursion as a function of frequency for a tuned ported speaker used in conjunction with the embodiment of FIG. 1.
Figure 10:
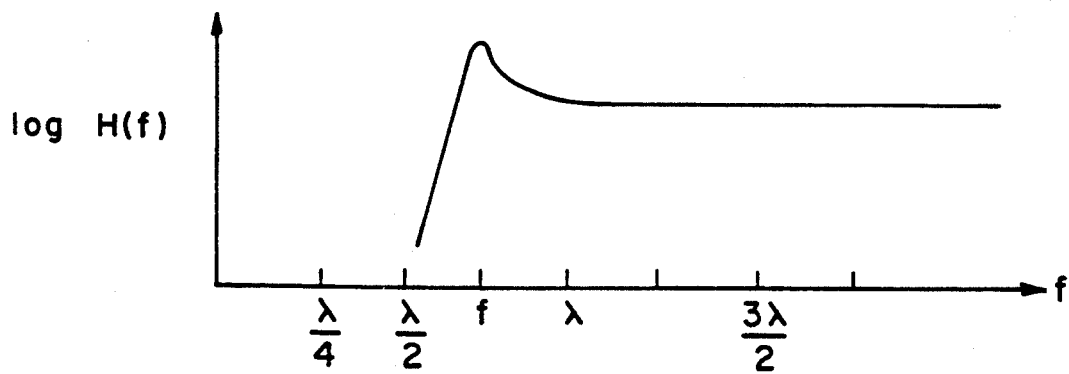
FIG. 10 shows the frequency response for an equalization circuit used with the ported speaker whose cone excursion is illustrated in FIG. 9.

Referring to FIG. 9, there is shown a graph of cone excursion versus frequency for the front ported speaker systems 114 and 116. Establishing the port resonance of front speaker systems at the frequency $f_m$ produces the desired compensation peak with minimum cone excursion. Below this frequency the cones of speakers 112 and 114 are subject to excessive excursions in the shaded area 502 of FIG. 9. Referring to FIG. 10, there is shown a graph of the frequency response of an electronic circuit for coupling energy to front speakers 112 and 114 having a sharp roll-off below the frequency $f_m$ that helps prevent speakers 112 and 114 from encountering excessive cone excursions in excess of their maximum allowable excursions. This circuitry also includes equalization circuitry that produces a substantially uniform frequency response for audible spectral components above the frequency $f_m$.

Figure 11:
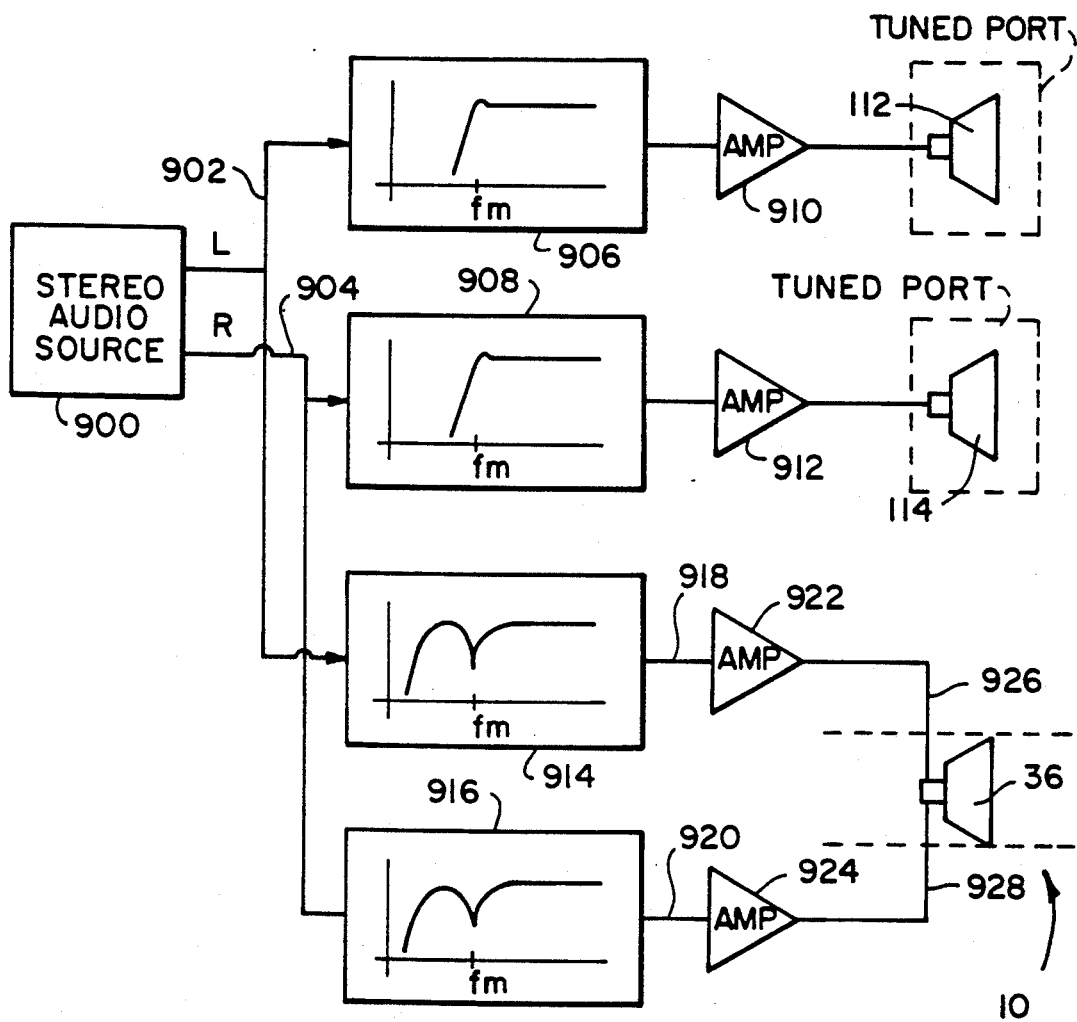
FIG. 11 is a block diagram showing the configuration of speakers and equalizers used in conjunction with the embodiment of FIG. 2.

Referring to FIG. 11, there is shown a block diagram of an exemplary embodiment of the acoustic waveguide loudspeaker system 10 of FIG. 1 used in conjunction with ported front door speakers 112 and 114 (FIG. 2) connected to electronic circuitry and audio power amplifiers to provide a compact vehicle sound system capable of reproducing stereo signals over essentially the full range of audible frequencies efficiently at high sound levels without audible distortion. Stereo audio source 900 (e.g., FM/AM radio receiver, stereo tape player, stereo compact disc player, or other suitable source) provides a left 902 and a right 904 stereo audio output channel. Electronic circuitry 906 and 08 have the frequency response of FIG. 10 for left front speaker 112 and right front speaker 114, respectively. Audio frequency power amplifiers 910 and 912 amplify the equalizer outputs of circuitry 906 and 908 to drive left and right door-mounted front speakers 112 and 114, respectively. Electronic circuitry 914 and 916 have the frequency response of FIG. 8 for the speaker driver 36 mounted in the acoustic waveguide loudspeaker system 10 of FIG. 1. Left channel output 918 and right channel output 920 energize audio power amplifiers 922 and 924, respectively. Each of the audio power amplifier outputs, 926 and 928, drive a respective voice coil in dual-coil loudspeaker driver 36. Alternatively, outputs 926 and 928 could drive respective voice coils on respective facing woofers 36' and 36" shown in FIG. 13A. This arrangement is advantageous because voice coil heat flow is spread over a larger area, and push-pull energizing woofers 36' and 36" helps reduce even harmonic distortion. As a further alternative woofer 36 may have a single voice coil that sums left and right channel bass components.

Figure 12:
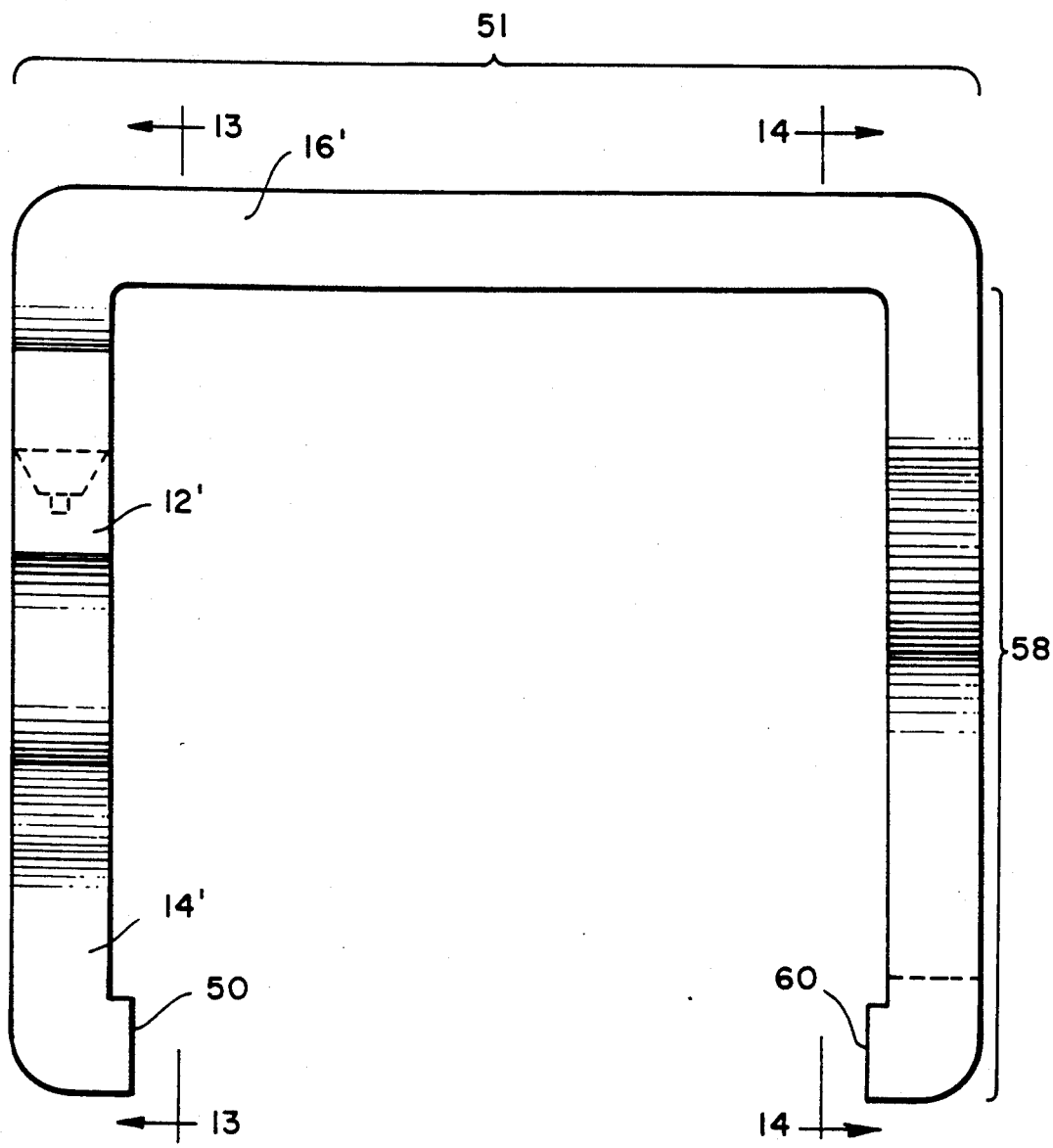
FIG. 12 is a plan view of an alternative embodiment of a loudspeaker system according to the invention showing an alternative loudspeaker driver placement.
Figure 13:
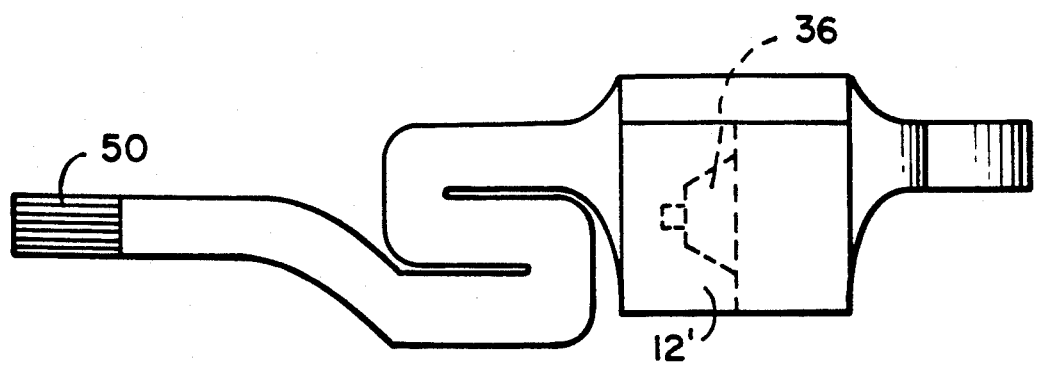
FIG. 13–13A is a view of the alternative embodiment of FIG. 12 taken along lines 13—13 of FIG. 12.
Figure 13A:
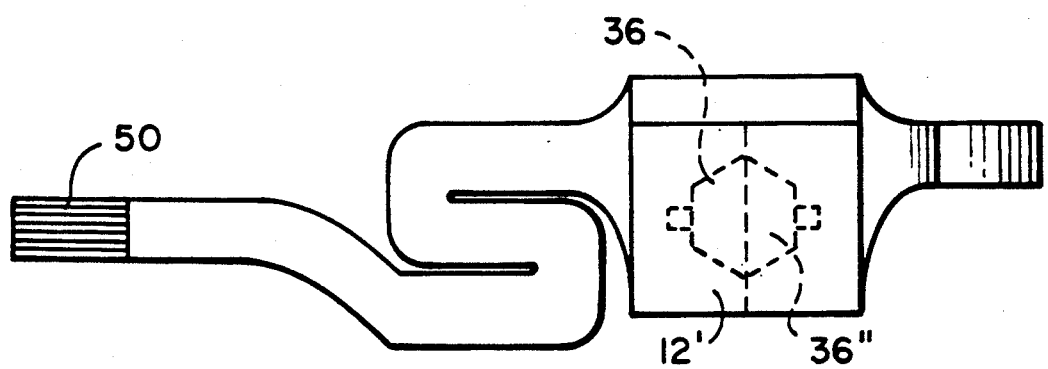
Figure 14:
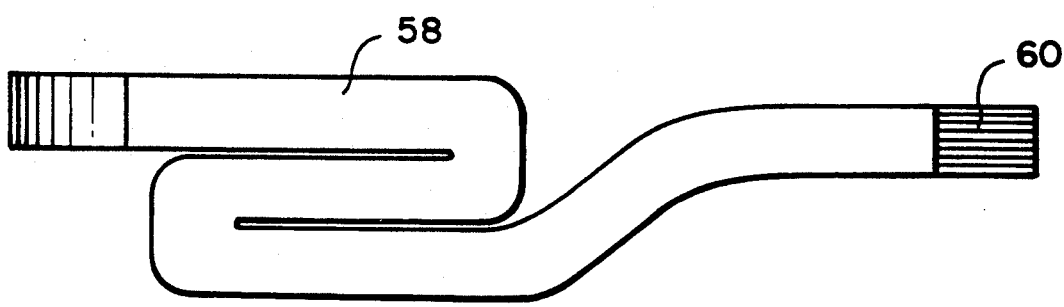
FIG. 14 shows a view of the alternative embodiment of FIG. 12 taken along lines 14—14 of FIG. 12.

Referring to FIG. 12, there is shown an alternative embodiment of the loudspeaker system of FIG. 2, with speaker chamber 12' asymmetrically located with respect to the overall shape of the loudspeaker system (i.e., along a side wall of the automobile rather than along the back wall). As shown in FIG. 13, short tubular waveguide 14' is a folder conduit, rather than being straight as in the embodiment of FIG. 1. As shown in FIGS. 12 and 14; long tubular waveguide 16 has a straight proximal portion 51 (FIG. 12), and a folded distal portion 58 (FIG. 14). This configuration allows an increased tubular waveguide length for response at sub-bass frequencies in a confined area such as a compact automobile.

Preferably the waveguide portion 10 of the loudspeaker system reproduces only spectral components below about substantially 150 Hz so that the source is not easily localizable to listeners allowing monophonic reproduction of these components in the stereo signal while the listeners perceive a good stereo image from receiving higher frequency spectral components from front enclosures 114 and 116. Preferably, waveguide portion 10 is electronically equalized, such as with techniques described in the aforesaid U.S. Pat. No. 4,628,528 or other suitable techniques, preferably causing a dip at frequency $f_m$ as shown in FIG. 8 while boosting the response correspondingly for front enclosures 114 and 116 or such other associated upper frequency reproducer, that might comprise a reproducer with a drone cone or other passive radiator, infinite baffle reproducer or other reproducer that coacts with the waveguide portion to provide a substantially uniform radiated power response around the frequency $f_m$ with low audible distortion.

There has been described novel apparatus and techniques for providing an economical improved loudspeaker system for installation in a vehicle in conveniently available space with negligible intrusion into the passenger compartment capable of faithfully and efficiently reproducing signals extending into the deep bass range with relatively compact structure especially suited for installation in a vehicle. It is evident that those skilled in the art may not take numerous uses and modifications of and departures from the specific embodiments and techniques described herein without departing from the inventive concepts. Consequently, the invention is to be construed as embracing each and every novel feature and novel combination of features present in or possessed by the apparatus and techniques herein disclosed and limited soley by the spirit and scope of the appended claims.

What is claimed is:

1. A vehicle loudspeaker system for providing sound pressure waves over a range of audio frequencies beginning with first bass frequency comprising, a vehicle body having inside surfaces enclosing a passenger compartment, a first loudspeaker driver disposed in a speaker chamber in said vehicle body outside said passenger compartment, said loudspeaker driver having a vibratile surface for generating sound pressure waves in response to electrical stimulation, at least a first elongated conduit having a proximal and a distal end, said proximal end being open to said speaker chamber and said distal end being open to said passenger compartment, said conduit extending from said speaker chamber to said passenger compartment with an effective length corresponding substantially to a quarter wavelength at said first bass frequency of sound pressure waves to be transmitted between said speaker chamber and said passenger compartment, said first loudspeaker driver being characterized by a diaphragm deflection frequency response having a notch frequency above said first bass frequency where said diaphragm deflection is a maximum, circuitry for driving said first loudspeaker driver comprising a notch filter having a frequency response characterized by a minimum at said notch frequency, at least one second loudspeaker driver disposed in said vehicle body adjacent to said passenger compartment, said second loudspeaker driver mounted in a ported enclosure, and said ported enclosure having a port resonance substantially at said notch frequency.

2. The vehicle loudspeaker system of claim 1, further comprising a second elongated conduit having a proximal and a distal end, said proximal end being open to said speaker chamber and said distal end being open to said passenger compartment, said second conduit extending from said speaker chamber to said passenger compartment with an effective length three times that of said first elongated conduit.

3. The vehicle loudspeaker system of claim 2, wherein the length of said first conduit equals substantially ¼ of a guide wavelength at said notch frequency.

4. The vehicle loudspeaker system of claim 2 wherein said distal ends of said first and second elongated conduits are disposed opposite each other.

5. The vehicle loudspeaker system of claim 4 wherein said first and second elongated conduits have a rectangular cross section of substantially constant area over the length of said conduits.

6. The vehicle loudspeaker system of claim 5 wherein said opening in said distal end of said first and second conduits has an area substantially equivalent to the area of said rectangular cross section.

7. The vehicle loudspeaker system of claim 1, wherein said circuitry further comprises a filter for sharply reducing said first loudspeaker driver response below said first bass frequency.

8. The vehicle loudspeaker system of claim 1 wherein said circuitry includes a filter for sharply reducing the pressure response of said second loudspeaker driver below said notch frequency.

* * * * *

UNITED STATES PATENT AND TRADEMARK OFFICE
CERTIFICATE OF CORRECTION

PATENT NO. : 5,170,435

DATED : December 8, 1992

INVENTOR(S) : Michael D. Rosen et al.

It is certified that error appears in the above-identified patent and that said Letters Patent is hereby corrected as shown below:

Column 4, line 20, "6" should read --16--.

Column 5, line 50, "08" should read --908--.

Signed and Sealed this

Eleventh Day of January, 1994

BRUCE LEHMAN

*Attest:*

*Attesting Officer*  *Commissioner of Patents and Trademarks*